United States Patent
Rutz

(10) Patent No.: US 6,557,814 B1
(45) Date of Patent: May 6, 2003

(54) RESTRAINING STRAP FOR SECURING PRESSURE VESSELS

(75) Inventor: Rene Rutz, Calgary (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 09/661,085

(22) Filed: Sep. 13, 2000

(30) Foreign Application Priority Data

Nov. 22, 1999 (CA) .............................................. 2290259

(51) Int. Cl.[7] .............................................. A47B 97/00
(52) U.S. Cl. ...................................... 248/505; 248/503
(58) Field of Search ................................. 248/505, 313, 248/154, 146, 499, 503; 405/172, 154, 157; 280/837; 410/50, 102, 111, 11, 12, 23, 96

(56) References Cited

U.S. PATENT DOCUMENTS

| | | | | |
|---|---|---|---|---|
| 1,519,854 A | * | 12/1924 | Lockwood | 24/300 |
| 1,705,381 A | * | 3/1929 | Snyder | 410/120 |
| 2,991,524 A | * | 7/1961 | Dobrikin | 24/371 |
| 4,338,045 A | * | 7/1982 | Cour | 405/172 |
| 4,367,572 A | | 1/1983 | Zielenski | |
| 4,712,162 A | * | 12/1987 | Quiogue | 248/505 |
| 5,308,101 A | * | 5/1994 | Monty | 280/480.1 |
| 5,932,037 A | | 8/1999 | Holroyd et al. | |

FOREIGN PATENT DOCUMENTS

DE 2446349 A1 * 9/1974

OTHER PUBLICATIONS

NFPA 52 Standard for Compressed Natural Gas (CNG) Vehicular Fuel Systems 1995 Edition.

* cited by examiner

Primary Examiner—Anita King
Assistant Examiner—Gwendolyn Baxter
(74) Attorney, Agent, or Firm—Sean W. Goodwin

(57) ABSTRACT

An improved restraining strap and method of using same is provided for securely attaching pressure vessels tanks to the supporting structure of a vehicle. Each strap has an extensible, elongated body which is lies over the tank and has first and second ends which are attached rigidly to the structure. A plurality of V-bends are spaced along the body between the first and second ends, each V-bend has an apex displaced out-of-line of the body so that when the tank is cycled between its contracted and expanded states, the body of the strap elastically shortens and lengthens while each V-bend flexes within the elastic range and providing a consistent vessel holding force. The holding force is sufficient to withstand acceleration and deceleration of the vehicle under normal operating conditions as well as under most impact conditions, whether the tank is fully expanded (pressurized) or fully contracted (depressurized).

4 Claims, 5 Drawing Sheets

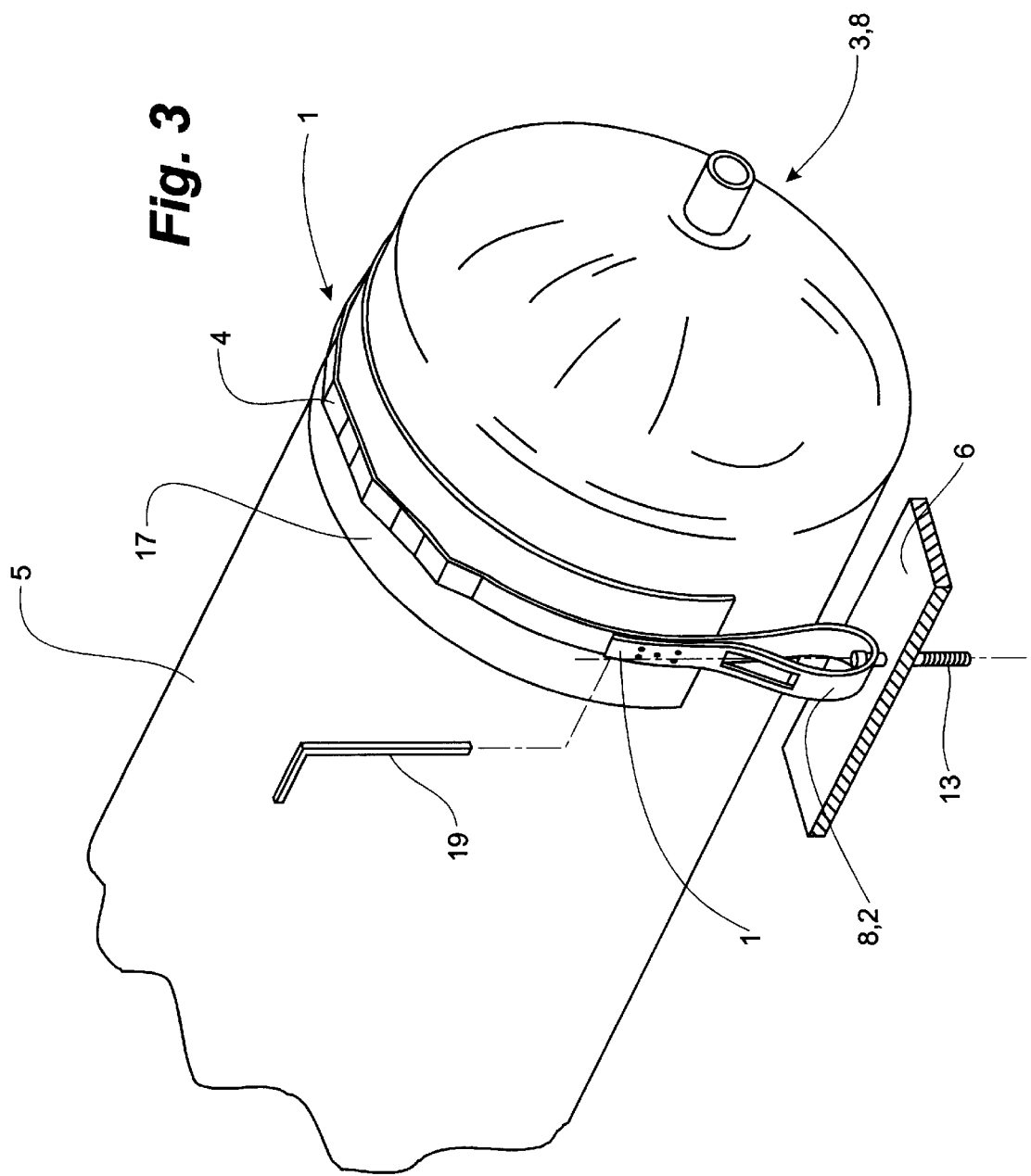

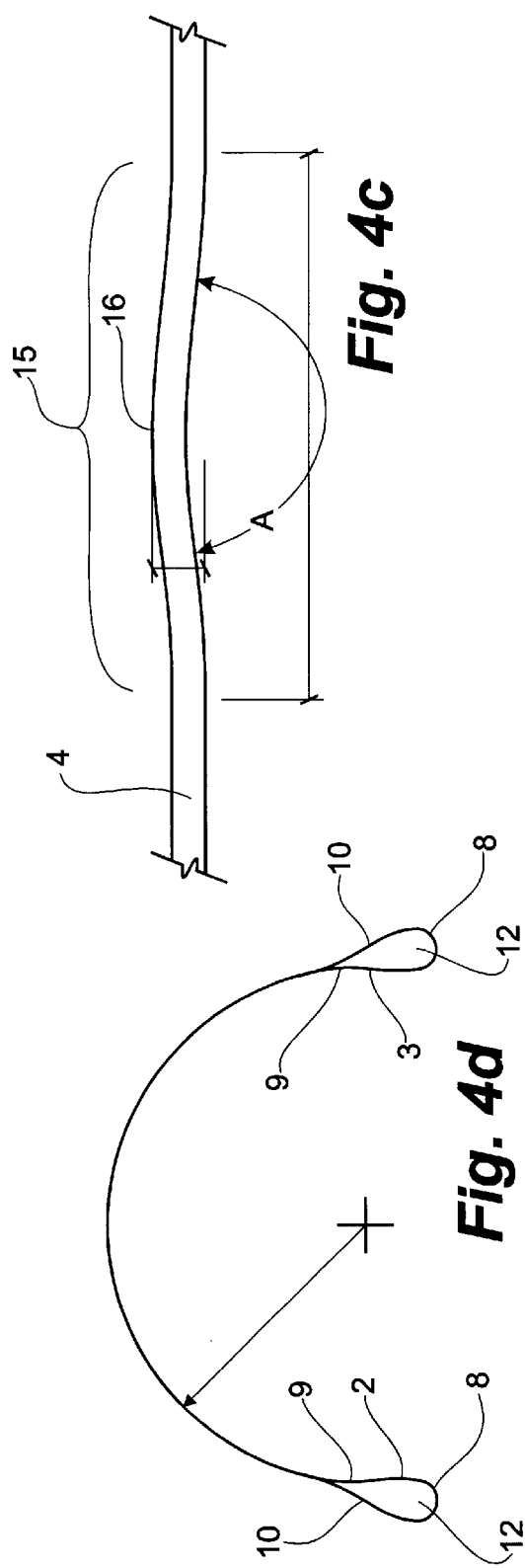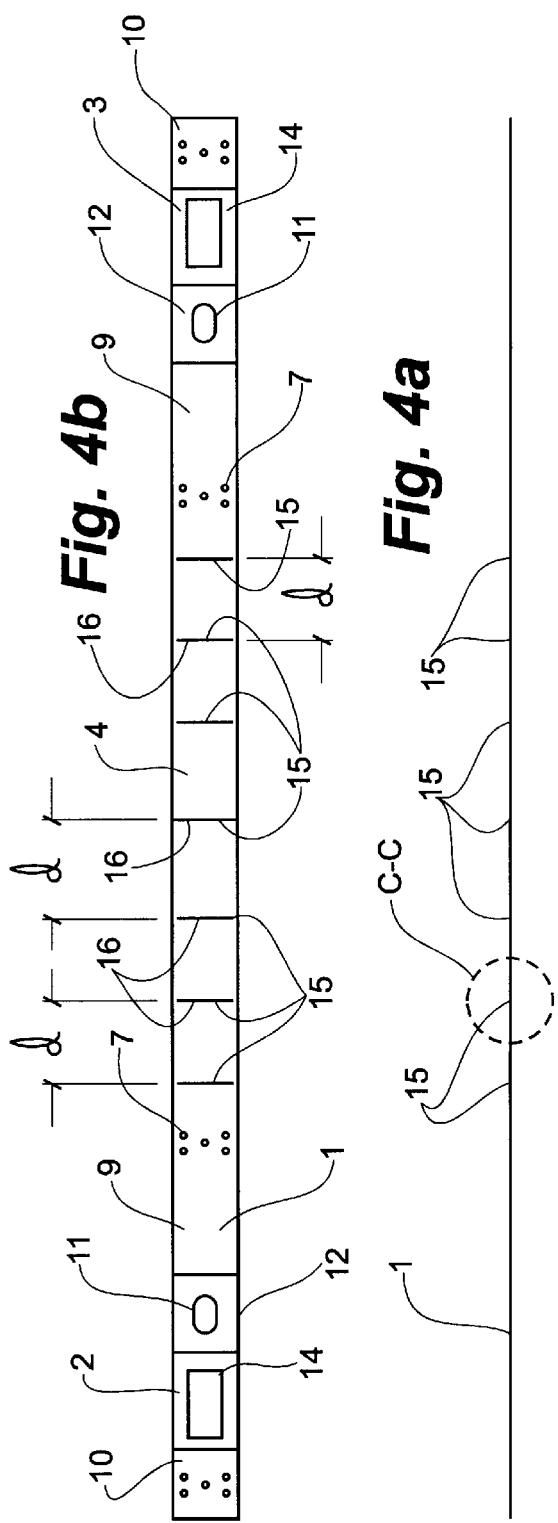

RESTRAINING STRAP FOR SECURING PRESSURE VESSELS

FIELD OF THE INVENTION

The invention relates to the field of devices used to secure heavy objects to support structures, the objects having variable outer dimensions such as do cycling pressure vessels, more particularly to securing compressed natural gas (CNG) fuel tanks to vehicles.

BACKGROUND OF THE INVENTION

Natural gas is more widely distributed throughout the world than crude oil. Since the 1920's, natural gas has been used to fuel vehicles in such countries as Italy. In 1995, approximately 100,000 vehicles in the United States and half that in Canada were fueled by natural gas. Significant growth in natural gas-fueled vehicles, especially in fleets, is gradually occurring throughout the rest of the world.

Natural gas, as delivered through pipelines, cannot be used directly as a mobile vehicular fluid and must be first physically compressed, liquefied or adsorbed. Compressed natural gas (CNG) for use in CNG-fueled vehicles is compressed between 3,000 and 3600 psi (20.77–24.92 MPa) and stored in tanks—usually ferrous, aluminum or non-ferrous liners wrapped in a fiber-reinforced tensile composite.

National Fire Protection Association (NFPA) standards (See NFPA 52, Chapter 3—3.3–3.9) require that CNG tanks must be secured to vehicles in such as a way as to prevent damage from road hazards, slippage, loosening or rotation, using a method capable of withstanding a static force, in the six principle directions (up, down, left, right, forwards, backwards), of eight times the weight of a fully pressurized container. For moving vehicles this equates to imposed relative acceleration or deceleration on the tank of 8 times gravity (8 g). Further, under these conditions, the tanks cannot be displaced more than ½ inch (13 mm).

When a vehicle accelerates or decelerates, the inertia of an attached tank resists the change in velocity, restrained to follow the vehicle's change in velocity only by its mounting means. A rear-ending situation or head-on collision can impose significant forces on the mounting means. If they are not capable of restraining the tank, it could conceivably be sheared from the vehicle and become a projectile. The NFPA code anticipates that most such loads on a tank would not exceed 8 g and hence mounting means meeting the code are adequate.

Typically, for atmospheric or stationary tanks, the mounting means need only support the tank's weight or restrain minor movement. However, wide changes in pressure (say 0 to 3000 psi) cause expansion and contraction of CNG fuel tanks. Typically, metallic liner CNG tanks can expand 0.5% at maximum fill pressure; a 500 mm diameter tank expanding about 2.0±0.5 mm. Plastic liner tanks (such as those under Department of Transport (DOT) Federal Motor Vehicle Safety Standards FMVSS-304, NGV2-98 Std, Type 4 tank) can experience expansion of even 5 times that experienced with ferrous or aluminum liner tanks.

The restraining devices must be able to expand and contract with the tank through multiple tank expansion and contraction cycles. If they do not, then they lose the ability to continue to apply sufficient force to the tank after it contracts, resulting in non-compliance with the code and greater potential for prohibited and possible hazardous movement. Most recently, in Los Angeles, a transit vehicle actually lost a plastic-liner, composite CNG tank because the restraining device could not maintain a pre-load through the pressure cycles.

As CNG tanks are pressure vessels, they usually do not incorporate integrated mounting elements. Accordingly, and referring to prior retraining devices shown in FIGS. 1 and 2, FIG. 1 illustrates a mere continuous strap formed around a tank. It is simple but is incapable to dealing with variable tank dimensions. If initially fitted to a depressurized tank with sufficient load to secure the tank, a failure eventually or immediately occurs in the strap or fastener at the mounted end when the tank grows larger under pressure.

As shown in FIG. 2, conventional multi-piece steel straps and spring attachments are also used to secure CNG fuel tanks to vehicles. The springs are adaptive to the expansion and contraction, however, multi-piece construction can result in excess noise (important in vehicular use), variable strap load around the tank, and fatiguing of the connections between the strap and the spring. Therefore, straps using spring attachments must be tested and replaced more frequently and are associated with increased installation time and labor cost. Characteristic of spring attachments, the compression of the spring to its designed deflection is not necessarily representative of the load throughout the strap. The spring responds only to the resistance to load at the ends of the strap, permitting the unwary to apply a pre-load to the spring representing only the frictional resistance of the strap leaving the tangent of the tank, leaving large areas of the tank having no pre-load at all (shown as a gap of exaggerated proportions in FIG. 2).

U.S. Pat. No. 4,367,572 to Zielenski discloses a composite elastic strap for securing rectangular batteries in vehicles. This composite strap comprises an elongate, notched rubber member having a saw-tooth-shaped fabric reinforcement member embedded within it. The resilient rubber can be stretched to a maximum, governed by extension of the fabric reinforcement member. This non-metallic composite strap helps Zielenski meet the following objectives: avoiding application of a rigid holddown device to an otherwise fragile battery case (particularly at the right angle corners), avoiding placing conductive metal about an electrical device; and avoiding the associated corrosion common with batteries. The composite strap is fitted with plates and hooks at each end for attachment to the vehicle.

Zielenski's application relies heavily on an elastomeric composite for achieving its forgiveness, anti-corrosion and electrical insulating properties. Unfortunately, the composite strap is neither capable of imparting the loads necessary, nor providing the long term consistent loading required for use with CNG tanks. Such a strap cannot withstand acceleration and deceleration and maintain secure attachment of large mass tanks to the vehicle. Substitution of a stronger metal reinforcement member defeats the forgiving and anticorrosion advantages. In particular, as stated by Zielenski, a metal restraint imposes unacceptably significant stresses on the upper edges of a battery. Additionally, in the CNG tank environment, this prior art strap will harden at low ambient temperatures, resulting in an inability to react to dimensional changes. As a tank shrinks, an initial pre-load will reduce or a space can even form between the strap and tank. The use of separate hooks for attachment further weakens the strap for restraining large loads.

There is therefore a demonstrated need for a restraining device that can reliably secure a heavy tank to a supporting structure regardless whether the tank is in an expanded or contracted state and is capable of maintaining its ability to retrain through multiple expansion and contraction cycles.

SUMMARY OF THE INVENTION

In one preferred aspect, an improved restraining device is provided for securely attaching heavy pressure vessels or tanks of curved section to the supporting structure of a vehicle. Each restraining device is a strap comprising a thin elongate unitary metallic member which, in use, extends about the curved wall of the tank, the ends of which are fastened rigidly to the supporting structure. The otherwise planer body of the strap has one or more localized bends. Axial loads impose on the straps due to dimensional changes to the tank are converted in part to moments in the bends, increasing the dimensional ability of the strap to lengthen without yielding. Accordingly, pressurization and depressurization of a CNG tank cause the strap to elastically lengthen and contract repeatedly while meeting or exceeding a predetermined restraining capability, without the use moving elements.

Therefore, in a broad apparatus aspect of the invention, an improved strap is provided for a restraining a tank, such as a pressure vessel, to a supporting structure. Pressure vessels are peculiar in that they have a contracted and an expanded state—affecting the size of the tank. Accordingly, the strap has an extensible, elongated body which is placed over the tank and has first and second ends. The improved strap further comprises means for fastening the first and second ends rigidly to the supporting structure and incorporates one or more V-bends formed in the body. The V-bends are spaced along the body between the first and second ends, each V-bend having an apex displaced out-of-line of the body so that when the tank is cycled between its contracted and expanded states, the body of the strap elastically shortens and lengthens while each V-bend flexes. When constructed from spring steel, the strap provides sufficient holding force to withstand acceleration and deceleration of the vehicle under normal operating conditions as well as under most impact conditions, whether the tank is fully expanded or fully contracted.

The improved strap makes it now possible to provide a novel method of securing pressure vessels to a supporting structure, such as a vehicle, comprising the steps of providing the above described strap and conforming it over at least a portion of the tank, the ends being rigidly attached to the supporting structure. So attached, a tensile stress is introduced into the strap's body so that the tank is securely restrained to the structure, the body being capable of elastically moving between two extreme positions so that when the tank cycles between depressurized and pressurized states, the V-bends in the body elastically flex sufficiently to continue to securely restrain the tank.

BRIEF DESCRIPTION OF THE DRAWINGS

FIG. 3 is a partial perspective view illustration one restraining strap securing a pressure vessel to a supporting structure;

FIGS. 4a–4d are various views which illustrate the relative proportions of one strap according to the example. More particularly FIG. 4a is a side view of a strap prior to forming the ends;

FIG. 4b is a top view of the strap of FIG. 4a;

FIG. 4c partial side view of an enlarged view of on of the bends of the strap of FIG. 4a;

FIG. 4d is a side view of the strap of FIG. 4a illustrated as if wrapped about a tank of circular cross-section;

Each of FIGS. 5a–5d are pairs of schematic graphs illustrating the stresses and strain on a strap. The right graph fancifully illustrates exaggerated dimensional changes in the strap. The left graph illustrates stress vs. strain which correspond to the dimensional changes. More particularly.

DETAILED DESCRIPTION OF THE PREFERRED EMBODIMENT

Figure 1:
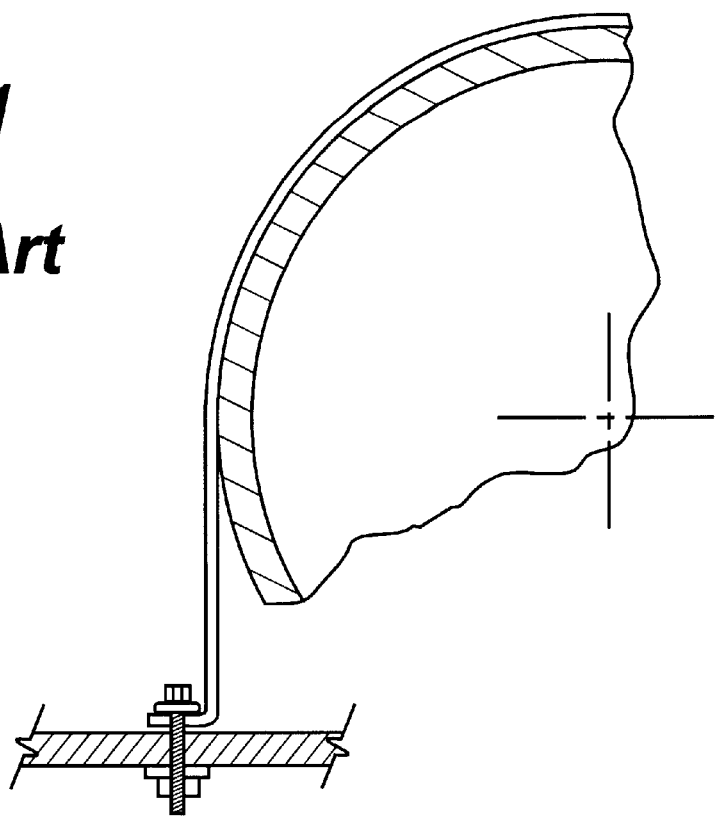
FIG. 1 is partial cross-sectional view of a prior art strap attachment.
Figure 2:
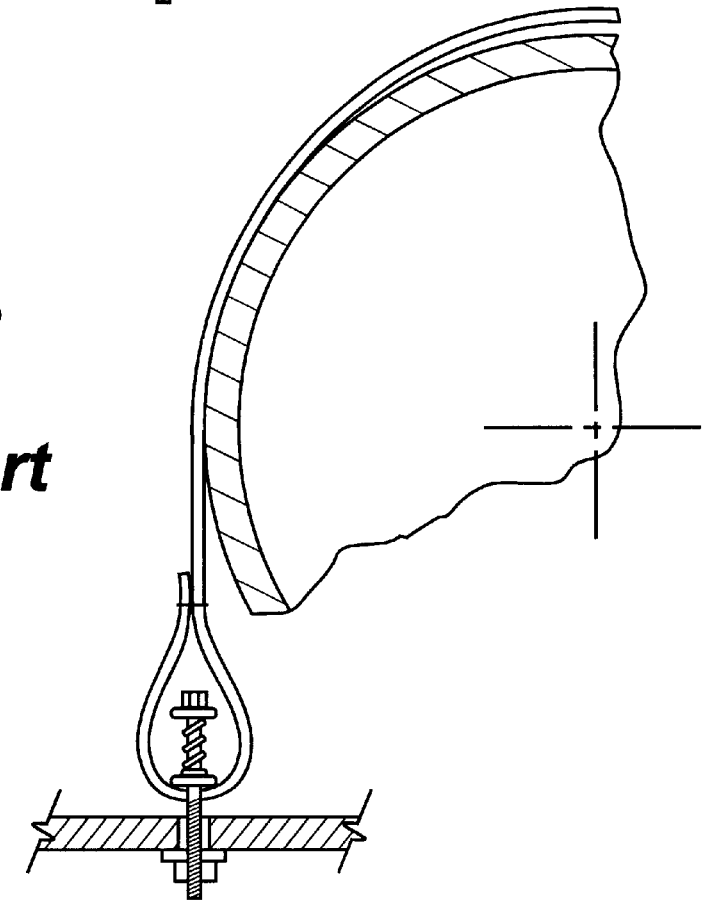
FIG. 2 is a partial cross-sectional view of a spring-loaded strap attachment.

Having reference to FIGS. 3 and 4a–4d, a spring steel strap 1 having a body 4 extending between a first end 2 and a second end 3. The body 4 is contour-wrapped about a tank 5 to secure it to a supporting structure 6, such as the roof or chassis of a vehicle 6a. The illustrated tank of FIG. 3 represents a CNG pressure vessel which is subjected to pressurization cycles between empty and filled states. Being a pressure vessel, the tank 5 has a curved profile.

Best shown in FIGS. 4a–4d, the strap 1 is a thin elongate member having a generally rectangular cross-section, wide in the transverse direction and thin in height. The first and second ends 2,3 of the strap 1 form loop 8, one at each end of the strap 1. Preferably, each loop is unitary with and formed from strap's body by folding the first and second ends 2,3 outward and back onto the strap's body 4, attached thereto with rivets 7. Each loop 8 has an inner portion 9 and an outer portion 10. Each loop 8 has a hole 11 bored at its apex 12 to allow passage of a machine cap-screw 13 for attachment to and fastening of each loop 8 rigidly to the supporting structure 6. A saddle (not shown) can be positioned between the head of the cap-screw 13 and curved strap loop 8 to allow for misalignment. Further, an access opening 14 is cut in the loop's outer portion 10 to allow access with a wrench 19 for loosening and tightening the cap-screws 13.

The strap 1 is formed with one or more V-bends 15 along its elongate body 4 and out of the plane of the body. The strap's body 4 conforms to the tank's circular shape as shown in FIG. 4d. Each V-bend 15 is formed so as to form a "V" with the concave portion facing the tank 5. Stated otherwise, at each V-bend 15, the body 4 first bends radially outwards and then bend equally inwards forming obtuse angle A at the apex 16.

Figure 6A:
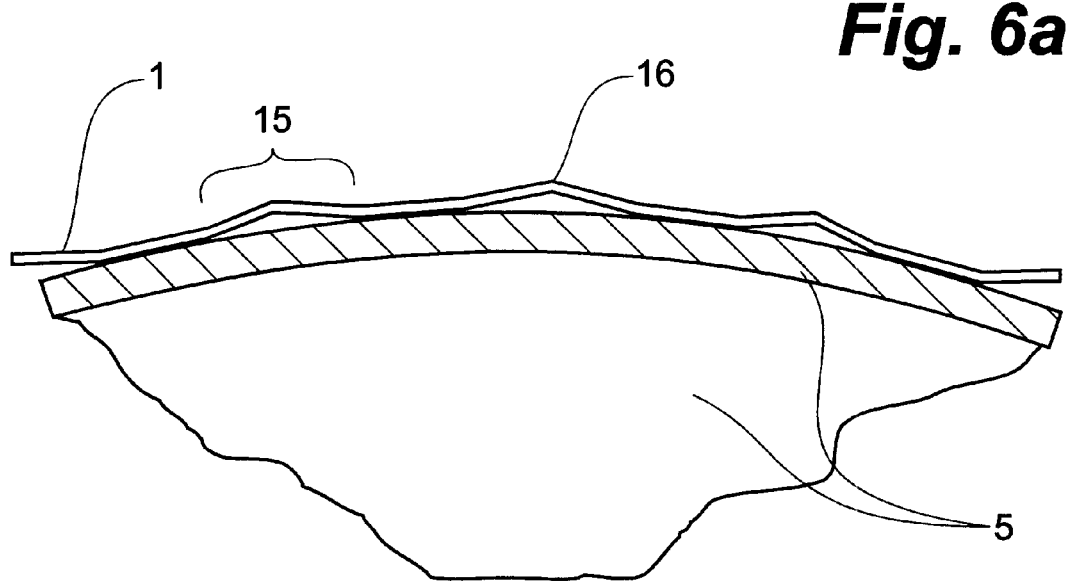
FIGS. 6a and b illustrate cross-sectional views of a portion of a tank wall having no pad and with a pad respectively.
Figure 6B:
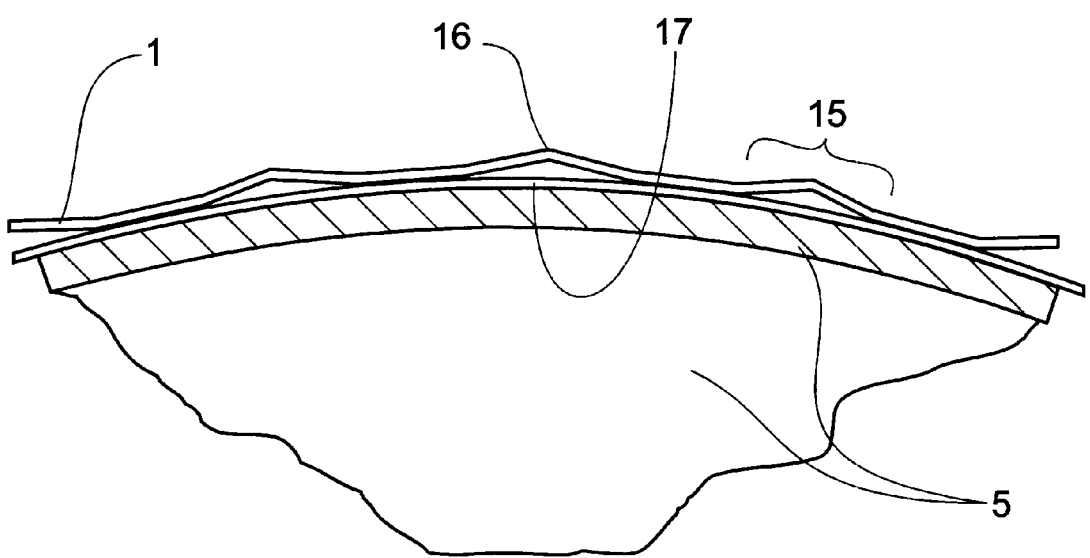

As shown in FIGS. 3 and 4d, in an initial restraining position, with the tank 5 at low or atmospheric pressure, the restraining strap 1 is secured to the vehicle by placing or lying the strap over the tank 5. Accordingly to CNG regulations, a non-water retaining rubber or neoprene pad 17 is placed between the strap 1 and the tank 5 (See FIGS. 3 and 6b). It is conceivable that where the NFPA52 code does not apply and corrosion is otherwise prevented, a pad 17 would not be required (See FIG. 6a).

Use of a neoprene pad typically interjects variability in conventional strap performance, given changes in temperature. The present invention continues to perform with the pad 17 in place. For instance, in cold conditions, when neoprene pad 17 is incapable of flexing, the restraining strap 1 adapts for permitting the required expansion and contraction. In warm conditions, the strap 1 compensates for variability in loading and compression of the softer pad 17.

The loops 8 at the first and second ends 2,3 of the strap 1 are forced down over either side of the tank 5, conforming to the tank's profile. Depending upon the length of the strap 1, the body 4 lies over or contacts at least a portion of the tank 5, shown as about 150° in FIGS. 3 and 4d. The two loops 8,8 are each rigidly attached to the supporting structure 6 with the cap-screws 13. Each loop 8 is unable to pull away from the supporting structure 6. Conventionally, a tank 5 is initially secured to the supporting structure 6 in the de-pressurized state. Accordingly, when the tank 5 is pressurized (filled), its diameter increases and the strap 1 must accommodate an increase in length without damaging the tank or itself plastically deforming. This is accomplished by elastic extension of the V-bend 15, responsive to an increased load on the strap 1 such as caused by expansion of the tank 5 under maximum fill conditions. The restraining strap 1 elastically returns to its normal restraining length when the tank again contracts. As the strap 1 does not plastically deform during its extension and contraction, it is capable of maintaining its restraining ability through multiple contraction and expansion cycles.

Referring to FIGS. 5a–5d, a prior art rigid strap 20 is compared with an improved strap 1 fitted with V-bends 15.

Figure 5A:
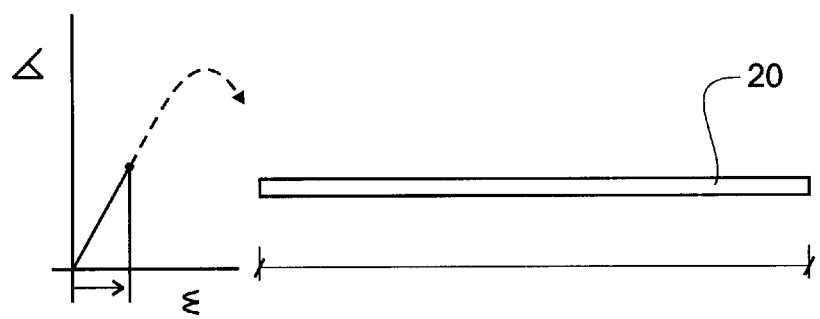
FIG. 5a illustrates a portion of a conventional planer strap which has been tightened with sufficient pre-stress to restrain a tank.
Figure 5B:
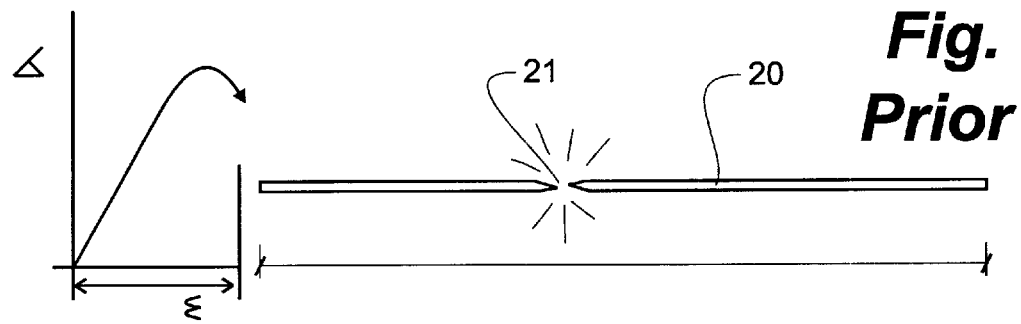
FIG. 5b illustrates the strap of FIG. 5a having been displaced to failure while being stretched between the initial tank restraining position of FIG. 5a and that imposed by the tank's dimensional changes.

As shown in FIGS. 5a and 5b, when a tank's 5 dimensions increase, a prior art strap 20 is constrained from moving; all strain manifesting as longitudinal strain and stress in the weakest portion 21 of the prior art strap 20 continues to increase, possibly reaching yield or even the ultimate tensile strength resulting in failure. Even if the prior art strap 20 doesn't break, irreversible plastic deformation will result in a loss of strap pre-load on the tank and non-compliance with the NFPA 52 code.

Figure 5C:
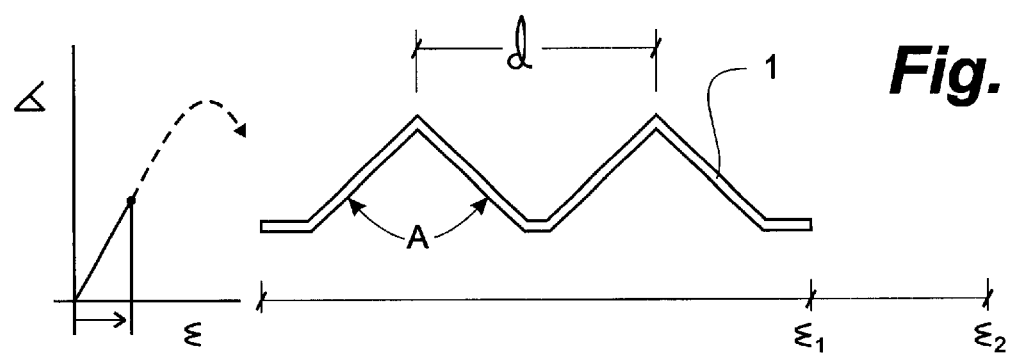
FIG. 5c illustrates an improved strap according to the present invention.
Figure 5D:
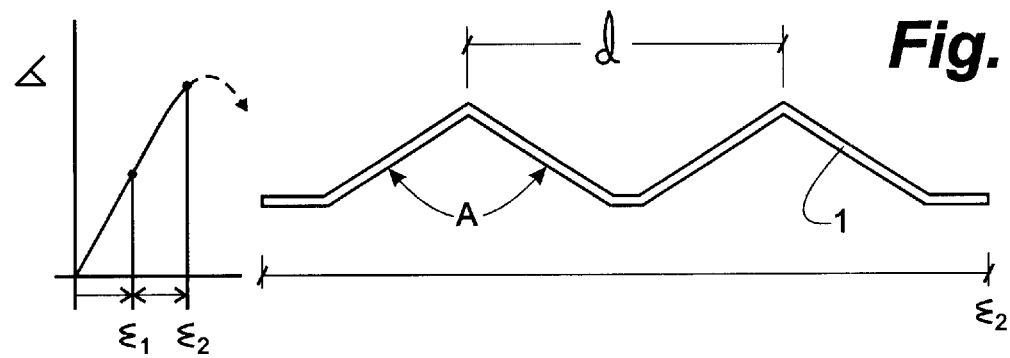
FIG. 5d illustrates the improved strap of FIG. 5c having been elastically displaced between the initial tank restraining position of FIG. 5a and that imposed by the maximum extent of the tank's dimensional changes.

Turning to FIGS. 5c and 5d, and distinguished from the behavior of the prior art strap 20 of FIGS. 5a, 5b, the V-bends 15 in the improved strap 1 permit greater dimensional strain to be absorbed by the strap, by converting substantially pure tensile strain into some bending strain as well so that, as the V-bends 15 flex, angle A opens elastically to become more obtuse than before.

When tank 5 expands due to an increase in pressure, such as when the tank is maximally filled to 3600 psi, the strain imposed on strap 1 increases. As illustrated in FIG. 5d, when the strain increases, strap 1 is capable of extending along its axial length from strain $\epsilon_1$ to $\epsilon_2$. Essentially, the strap's V-bends 15 flatten, increasing angle A and resulting in an elastic increase in the distance d between V-bends 15 and the overall length of the strap 1. Stress σ, although greater than the depressurized case, still does not reach yield or exceed the strap's ultimate tensile strength (UTS).

When gas in the tank is consumed, the pressure reduces and the tank 5 contracts. The restraining strap 1 returns to its normal restraining length. This is possible, despite repeated cycles, because the extension and contraction that have occurred in the strap 1 fall within the elastic range of the material from which the strap is manufactured. In other words there has been no plastic deformation of the restraining strap 1. Extension and contraction of the restraining strap 1 can continue in this manner through multiple tank expansion and contraction cycles without any permanent lengthening of the restraining strap 1 and loss of ability to securely restrain the tank 5.

As an example, and having reference to FIGS. 4a–4d, one or more straps 1 were provided for securing each of a plurality of CNG tanks to a vehicle in conformance with the NFPA 52 code for withstanding 8 g. In this example, a fiber-wrapped 340 mm outside diameter by 3000 mm long tank 5 was secured to a part of a vehicle 6a using a total of two straps. Each strap body was made of 50 mm wide and 1.1 mm thick spring steel (FIGS. 4a, 4b). The loops 8 at the ends 2,3 of each strap were formed from excess body material. Accordingly, about 300 mm at each end of an overall 1100 mm long body were rolled back upon the body and riveted thereto, forming each loop having about a 16 mm radius (FIGS. 4b, 4d). About 16 mm wide by 25 mm long slots 14 were formed in the ends of the loops for passing cap-screws 13 therethrough and into the supporting structure 6 (FIG. 4b).

As shown in detail in FIG. 4c, each of seven V-bends 15 had an overall length of 32 mm. In FIG. 4b, the relative positioning of the V-bends is shown. Basically, the V-bends were substantially equally spaced d from one another; one V-bend was positioned at the middle of the strap and each of the others were spaced apart, three towards either end. Measured from the middle V-bend, the measurements between each successive V-bends were about 75 mm, 65 mm and 65 mm. The apex 16 of each V-bend was displaced outwards about 1 mm. Accordingly, the apparent thickness of the body varied from about 1.1 mm to 2.1 mm As shown in FIG. 4d, when wrapped about the tank (tank not shown), each strap fits the 340 mm diameter tank with the loop attachment to the vehicle being just below the tank's centerline. When each loop's cap-screws were tightened to the supporting structure 6, sufficient pre-load was introduced into the straps to restrain the tank against a force of 8 times the tank's weight in each of the 6 principle directions as a result of inertial loading due to acceleration and deceleration of the vehicle.

As described above, each of these straps maintained sufficient pre-load to meet the 8 g requirement despite repeated pressure cycling between atmosphere and 3600 psi.

THE EMBODIMENTS OF THE INVENTION IN WHICH AN EXCLUSIVE PROPERTY OR PRIVILEGE IS BEING CLAIMED ARE DETAILED AS FOLLOWS:

1. A method of securing one or more pressure vessels to a supporting structure comprising the steps of:

(a) providing a strap comprising an elongate, extensible member having a first end, a second end and a substantially linearly-extending body therebetween, the body having one of more V-bends formed therealong, each end of the extensible member being formed into a loop;

(b) conforming the body about at least a portion of each of the one or more pressure vessels; and (c) passing a fastener through the loops and into the supporting structure for rigidly sandwiching the loops and strap to the supporting structure. and thereby introducing a tensile stress in the body so that each of the one or more pressure vessels is securely restrained to the structure, the body being capable of elastically moving between two extreme positions so that when each of the one or more pressure vessels cycle between depressurized and pressurized states, the V-bends in the body elastically flex sufficiently to continue to securely restrain each of the one or more pressure vessels; and (d) placing an elastomeric pad between the pressure vessel and the strap.

wherein the supporting structure is a vehicle subject to acceleration and deceleration.

2. A strap for restraining a tank to a supporting structure, the tank having a contracted and an expanded state, the strap comprising:

an extensible, elongated metallic body adapted for extending over the tank, the body having a rectangular cross-section which is wide in a transverse direction, and having first and second ends each of which are rolled back onto the body adjacent their respective ends and are affixed to the body for forming a loop;

bolts extending through holes formed in each said loop adapted for affixing each said loop to the supporting structure;

an elastomeric pad adapted for placement between the tank and the strap and one or more V-bends formed in the body and spaced therealong between the first and second ends, each V-bend having an apex displaced out-of-line of the body forming outward extending and inwardly extending slopes with an obtuse angle therebetween so that when the tank is cycled between the tank's contracted and expanded states, the body of the strap elastically shortens and lengthens while each V-bend slope flexes between less obtuse and more obtuse angles respectively;

wherein the supporting structure is a vehicle subject to acceleration and deceleration.

3. A method of securing one or more pressure vessels to a supporting structure comprising the steps of:

(a) providing a strap comprising an elongate, extensible metallic member having a first end, a second end and a substantially linearly-extending body therebetween, the body having one of more V-bends formed therealong, loops being formed at the first and second ends of the strap;

(b) conforming the body about at least a portion of each of the one or more pressure vessels;

placing an elastomeric pad between each of the one or more pressure vessels and the strap and (c) rigidly attaching the loops to the supporting structure by passing a fastener through the loops and into the supporting structure and thereby introducing a tensile stress in the body so that each of the one or more pressure vessels is securely restrained to the structure, the body being capable of elastically moving between two extreme positions so that when each of the one or more pressure vessels cycles between depressurized and pressurized states, the V-bends in the body elastically flex sufficiently to continue to securely restrain each of the one or more pressure vessels.

wherein the supporting structure is a vehicle subject to acceleration and deceleration and the strap continues to securely restrain each of the one or more pressure vessels.

4. A strap for restraining a tank to a supporting structure, the tank having a contracted and an expanded state, the strap comprising:

an extensible, elongated metallic body which is placed over the tank and has first and second ends;

loops formed at each of the first and second ends of the strap by rolling each of the first and second ends back onto the body adjacent. the ends and affixing the ends to the body adapted for fastening the first and second ends rigidly to the supporting structure using bolts extending through holes formed in the said loops for affixing said loops to the supporting structure and placing a minimum elastic strain in the strap to restrain the tank to the supporting structure;

one or more V-bends formed in the body and spaced therealong between the first and second ends, each V-bend having an apex displaced out-of-line of the body forming outward extending and inwardly extending slopes with an obtuse angle therebetween so that in a first position when the tank is in its contracted state, the body of the strap elastically shortens and each V-bend slope flexes to a less obtuse angle while maintaining the minimum elastic strain and thus restraining the tank, and in a second position when the tank is in its expanded state, the body of the strap elastically lengthens and each V-bend slope flexes to a more obtuse angle while maintaining the minimum elastic strain and thus restraining the tank.

wherein the supporting structure is a vehicle subject to acceleration and further imposing inertial loading on the one or more pressure vessels and the strap continues to securely restrain each of the one or more pressure vessels.

* * * * *